United States Patent Office 3,463,661
Patented Aug. 26, 1969

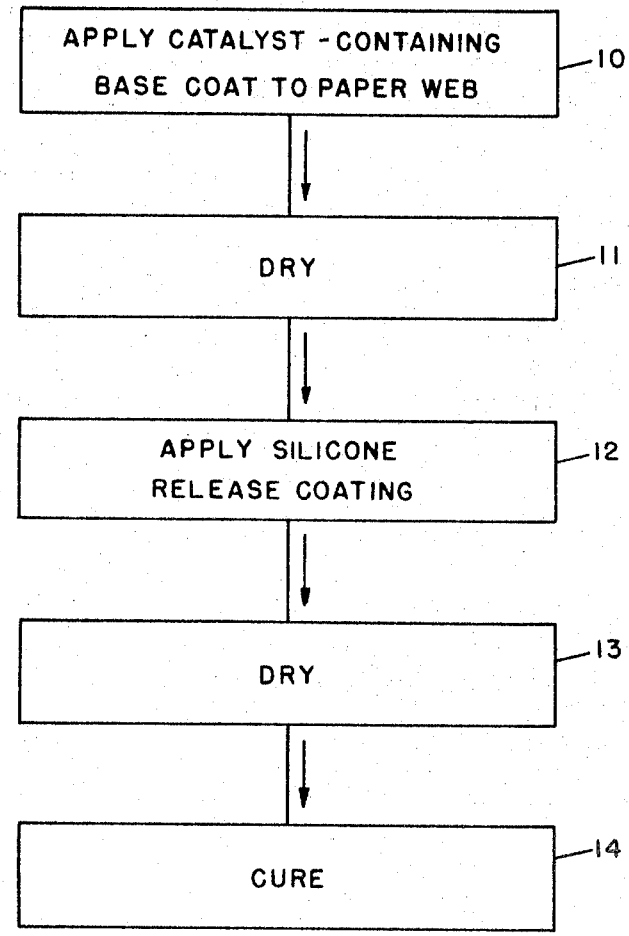

3,463,661
PROCESS FOR PREPARING PAPER WITH
SILICONE RELEASE COATING
Robert A. Benson, Gorham, Maine, assignor, by mesne assignments, to Scott Paper Company, Delaware County, Pa., a corporation of Pennsylvania
Filed Jan. 14, 1966, Ser. No. 520,607
Int. Cl. B44d 1/14
U.S. Cl. 117—76                    6 Claims

ABSTRACT OF THE DISCLOSURE

A process for preparing a silicone release coating comprising applying to a flexible fibrous substrate a base coating containing a silicone polymerization catalyst, drying said base coating, applying to said base coating a top coating containing a polymerizable silicone resin and curing said top coating.

---

This invention is concerned with a process for manufacturing release papers and the like wherein the release coating contains a cured silicone.

The methods and materials for the manufacture of silicone coated release papers are well known. See for example U.S. Patents Nos. 2,869,722; 2,940,875; 3,046,160 and 3,050,411, the disclosures of which, particularly with regard to the nature of the useful silicone resins, the catalysts used for curing, the coating formulations and the substrates, are hereby incorporated by reference.

One of the difficulties encountered in applying a silicone release coating is that after the catalyst is incorporated into the coating formulation in sufficient amounts to give a good cure, the mixture has a short pot life and must be consumed fairly rapidly. Only relatively small batches can be used, which is an unsatisfactory way of operating with commercial paper coating equipment. If the amount of catalyst is cut down to increase pot life, then the release coating will not be sufficiently cured, and hard release and silicone transfer will result. Also, if the paper has a base-coat formed with a latex binder, the latex tends to inhibit the cure of the silicone.

It has now been found that these and other difficulties can be overcome by incorporating a large part, if not all, of the requisite amount of catalyst in the base coat. After the silicone coating has been placed over the base coat, the coated sheet is heated to the temperature required to effect drying and curing of the silicone coating. The catalyst migrates from the base coat into the release coat, giving a hard cure, probably by being dissolved by the solvent or vehicle in the release coating composition. Surprisingly effective results are obtained, even when a base coat containing a high level of latex is used. Pot life of the silicone coating is no longer a problem.

The drawing, attached to and forming a part of this specification, is a schematic illustration of the essential steps of the present process. In the drawing, a suitable base sheet such as a paper web has applied to it at 10 a conventional pigmented aqueous paper coating that has added to it the catalyst for the silicone resin. This levels and seals the surface. This coating is dried at 11, following which the silicone coating formulation, free from, or containing only minor amounts of the catalyst, is applied in a known manner at 12. This coating is dried at 13. The silicone resin is then cured at 14 by being heated to a temperature in the range of 140° C. to 200° C. (for a time in the order of 30 to 300 seconds). The drying and curing can be carried out simultaneously.

EXAMPLES

The following base coats were prepared by simple mixing (parts by weight):

Base Coat A (35% solids)

| | |
|---|---|
| English coating clay (A–1) at 60% | 334 |
| Soy protein in ammonia (LV Protein) at 20% | 250 |
| Poly ethyl acrylate (Rhoplex B–15)[1] at 50% | 20 |
| Ketone-formaldehyde resin (Beckamine[2] P–468–70) | 2 |
| TSPP (Phosphotex)[3] | 2 |
| Antifoamant (Siotol 124)[4] | 0.5 |
| Dye (Rhodamine 6–G DN)[5] at 1% | 2 |
| Aqueous emulsion of tin octate catalyst (Catalyst 22A)[6] at 24% | 27 |
| Water | 140 |
| | 777.5 |

[1] Rohm & Haas.
[2] Reichhold Chemicals, Inc.
[3] Monsanto.
[4] Imperial Chemical Industries.
[5] Du Pont.
[6] Dow Corning.

Base Coat B

| | |
|---|---|
| Styrene Butadiene latex (Dow Chemical's 612–R) at 50% | 180 |
| Water emulsion of tin octoate catalyst (Dow Corning's Catalyst 22A) @ 24% | 20 |
| | 200 |

These coatings were applied to a body stock weighing about 92 pounds per ream (25" x 38"—500 sheets) made from a moderately beaten mixture of equal parts of long and short wood fibers, unsized and substantially free from filler. Base coat A was applied in the amount of 10 pounds per ream on the wire side with an air-knife coater and dried one minute at 140° C. Base coat B was applied in the amount of 5 pounds per ream with a No. 9 Mayer bar and dried 30 seconds at 140°C.

The following two release coatings were formulated by simple mixing (parts by weight):

Release Coating No. 1

| | |
|---|---|
| Water | 141 |
| Dye (Patent Blue—2Y[1]) at 1% | 4 |
| Polyvinyl alcohol (DuPont's PVA 71–30) at 10% | 200 |
| Silicone resin (Syl-off 22[2]) at 40% | 50 |
| Glacial Acetic Acid | 2 |
| Wetting agent (Triton X–100[3]) at 10% | 8 |
| Catalyst (Dow-Corning's Catalyst 22A) at 24% | 5 |

[1] American Cyanamid.
[2] Dow-Corning—a mixture of dimethyl and methyl hydrogen polysiloxane in aqueous emulsion.
[3] Rohm & Haas—Non-ionic alkyl aryl polyether alcohol sulfonate.

Release Coating No. 2

| | |
|---|---|
| Hexane | 147.5 |
| Silicone Resin (C–4–2009[1]) at 100% | 16.5 |
| Catalyst (Catalyst 23A[2]) | 0.5 |
| | 164.5 |

[1] Dow-Corning—a solvent solution of a mixture of dimethyl and methyl hydrogen polysiloxanes of lower molecular weight than Syl-off 22.
[2] Dow-Corning—tin octoate in solvent solution.

The use of dyes in the base and release coatings is optional.

Each of the release coatings were applied to the above described two base coated sheets. Coating #1 was applied in an amount of 2 pounds per ream with an air-knife coater, dried one minute at 140° C. and cured one minute at 190° C. Coating #2 was applied in an amount of 1 pound per ream with a No. 5 Mayer bar, dried and simultaneously cured for one minute at 190° C. Excellent release coats having a hard cure were obtained in all cases. The pot lives of both coatings were in excess of 10 hours.

In summary, the process of this invention comprises coating a suitable substrate with a conventional pigmented coating containing a large portion of the catalyst, preferably over 90 percent, required to cure the subsequently applied silicone coating, followed by drying, application of the silicone coating containing only a small portion, if any, of the required amount of catalyst, and curing at an elevated temperature.

Having described this invention, what is sought to be protected by Letters Patent is succinctly set forth in the following claims.

I claim:

1. A process of preparing a flexible fibrous web having a silicone release coating comprising coating a flexible fibrous substrate with a base coating containing a water based adhesive binder selected from the group of a latex or alkali soluble protein or mixtures thereof and a major portion of the total amount of silicone polymerization catalyst to be employed, drying said base coating, applying over said base coating a top coating containing a polymerizable silicone resin and a liquid vehicle and curing said silicone resin to a hard insoluble state by heating said top coating.

2. The process of claim 1 wherein said silicone polymerization catalyst amounts to at least 90% of that required to cure said silicone resin.

3. The process of claim 1 wherein said base coating contains a mineral pigment.

4. The process of claim 1 wherein said top coating is a solvent-based coating.

5. The process of claim 1 wherein said top coating is a water-based coating and contains a minor amount of said silicone polymerization catalyst.

6. The process of claim 1 wherein the adhesive binder is a latex.

References Cited

UNITED STATES PATENTS

| | | | |
|---|---|---|---|
| 2,746,878 | 5/1956 | Rush | 117—76 X |
| 2,949,382 | 8/1960 | Dickerman et al. | 117—76 X |
| 2,985,545 | 5/1961 | Leavitt | 117—161 X |
| 3,058,850 | 10/1962 | Sell | 117—161 X |
| 3,166,434 | 1/1965 | Gauger | 117—76 X |
| 3,227,579 | 1/1966 | Bluestein | 117—62.2 X |
| 3,328,482 | 6/1967 | Northrup et al. | 117—161 X |

WILLIAM D. MARTIN, Primary Examiner

R. HUSACK, Assistant Examiner

U.S. Cl. X.R.

117—155, 161, 83